United States Patent [19]

Socha, Jr.

[11] Patent Number: 4,468,366
[45] Date of Patent: Aug. 28, 1984

[54] BAFFLED LAMINATED EXTRUSION DIES

[75] Inventor: Louis S. Socha, Jr., Painted Post, N.Y.

[73] Assignee: Corning Glass Works, Corning, N.Y.

[21] Appl. No.: 409,403

[22] Filed: Aug. 19, 1982

[51] Int. Cl.³ .............................................. B29F 3/04
[52] U.S. Cl. ............................. 264/177 R; 264/209.1; 264/209.8; 425/192 R; 425/198; 425/376 A; 425/381; 425/461; 425/464; 425/466; 425/467
[58] Field of Search ............. 264/177 R, 209.1, 209.8; 425/381, 192 R, 461–467, 197–199, 376 A

[56] References Cited

U.S. PATENT DOCUMENTS

| 2,908,037 | 10/1959 | Harkenrider | 425/199 |
| 2,946,090 | 7/1960 | Houvener | 425/197 |
| 3,861,843 | 1/1975 | Keuchel et al. | 425/198 |
| 3,905,743 | 9/1975 | Bagley | 425/464 |
| 3,923,444 | 12/1975 | Esper et al. | 425/461 |
| 3,954,365 | 5/1976 | Barth et al. | 425/197 |
| 3,983,283 | 9/1976 | Bagley | 425/461 |
| 4,168,944 | 9/1979 | Morikawa et al. | 425/464 |
| 4,298,564 | 11/1981 | Higuchi et al. | 264/209.1 |
| 4,321,025 | 3/1982 | Cunningham | 425/467 |
| 4,343,604 | 8/1982 | Minjolle | 425/461 |

FOREIGN PATENT DOCUMENTS 2311685 9/1974 Fed. Rep. of Germany ...... 425/461

Primary Examiner—Jeffery R. Thurlow
Attorney, Agent, or Firm—B. R. Turner

[57] ABSTRACT

Method and apparatus is set forth for extruding honeycomb structures having cohesive cellular walls from an extrusion die. A baffle member is provided within the flow passageways of the die so as to provide impedance to longitudinal batch flow through certain of the discharge slots such that the impedance to flow in all of the slots is substantially equal, thus improving product quality and knitting or cohesiveness of the batch material prior to discharge from the die.

13 Claims, 7 Drawing Figures

BAFFLED LAMINATED EXTRUSION DIES

BACKGROUND OF THE INVENTION

Extrusion dies have been found to be useful in forming cellular or honeycomb ceramic substrates for use in catalytic converters utilized in the exhaust system of internal combustion engines. In order for such converters to function efficiently, it is necessary that the cells provide a substantially large surface area for catalytic material to react with the exhaust gases, and that the cell walls have a substantially thin cross-sectional dimension so as to provide a substantially large open frontal area and thereby reduce back pressure within the exhaust system. However, the thin walled structure must have sufficient mechanical and thermal integrity so as to withstand normal automotive impact and thermal requirements.

In order to provide increased surface area within the honeycomb structure so as to enhance catalytic activity, the number of cells has been increased from about 175 per sq. in. to 400 or more cells per sq. in., whereas the wall thickness between the cells has been reduced from about 10 mils to 6 mils or less. Accordingly, since the present invention is directed toward the extrusion of honeycomb structures having up to about 600 cells per sq. in. with a wall thickness of down to about 4 mils, the manufacture of the extrusion dies necessary for producing such honeycomb structures has required a variety of technological advances.

As pointed out in U.S. Pat. No. 3,905,743, extrusion dies may be formed in unitary die blocks by utilizing conventional machining and cutting techniques, electric discharge machining, or chemical machining. In addition, a plurality of machined or cut stacked plates are disclosed in such patent for forming laminated dies useful in extruding honeycomb structures. Further, U.S. Pat. No. 3,923,444 discloses a laminated extrusion die for forming honeycomb structures wherein a plurality of elongated extrusion plates are stacked upon one another and clamped together to form an extrusion die. However, it has been found that when forming honeycomb structures having a wall thickness of about 0.006" or less with the use of laminated die plates, the batch material had a tendency to flow longitudinally through the die with insufficient lateral flow to produce good knitting of the interconnected cellular walls of the substrate. In other words, the discharge slots which are formed longitudinally between the laminated plates, have a tendency to function as a continuation of the feed slots and are provided with adequate flow, whereas the discharge slots formed transversely across such plates, do not receive sufficient flow of the batch material to form complete knitting, and thus a continuous cellular mass is not provided prior to being discharged from such slots.

The present invention has overcome the batch flow problems encountered with laminated dies when forming cellular substrates having relatively thin wall thicknesses of about 0.006" and below. A baffle plate is provided between adjacent die blades so as to adjust the flow impedance of the batch material within the discharge slots between the teeth of adjacent plates, to be similar to the impedance to batch flow which is encountered within the discharge slots between adjacent teeth formed in each die blade. Thus, the impedance to the batch flow within the various discharge slots is equalized, and a continuous cellular mass is formed within the die prior to being discharged longitudinally therefrom.

SUMMARY OF THE INVENTION

In its simplest form, the present invention is directed to an improved extrusion die structure for forming thin walled cellular or honeycomb structures, and to a method of flowing the batch material through the die so as to produce a substrate with completely knitted or continuous cellular walls. Each pair of the adjacent laminated extrusion plates or die blades is provided with a baffle means therebetween, for increasing the impedance to the batch material flowing longitudinally through the die from the feed channels, to an extent to substantially equal the impedance to batch material flowing laterally of the laminated die, so that the discharge slots extending transversely across each of the adjacent extrusion plates or die blades, forming the laminated die, are also filled with batch material. Accordingly, the flow of batch material is distributed to all of the discharge slots, extending both transversely across and longitudinally between the extrusion plates or die blades, so as to form an interconnected cellular mass within the die body prior to being discharged therefrom, and thus provide an extruded substrate having completely knitted or continuous cellular walls. It thus has been an object of the present invention to provide a novel, relatively easily manufacturable extrusion die, for forming thin-walled honeycomb structures having relatively thin cellular walls which are continuous along their extent.

DESCRIPTION OF THE PREFERRED EMBODIMENTS

Figure 1:
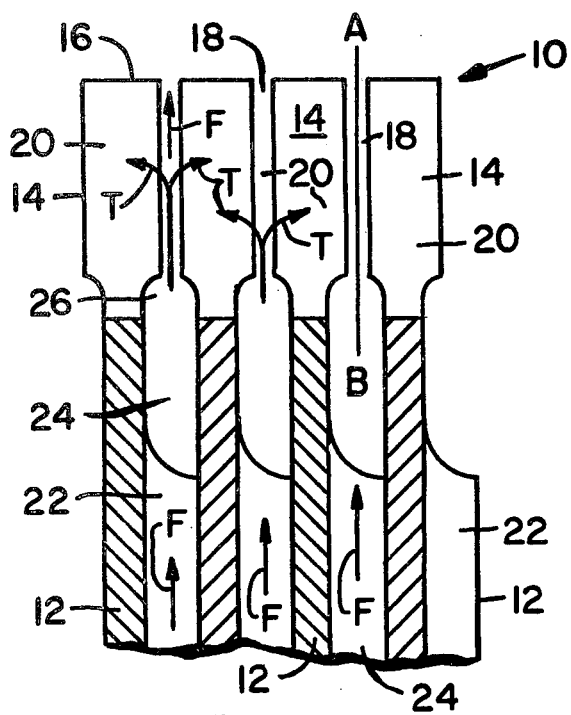
FIG. 1 is a greatly enlarged fragmental view in section embodying a portion of an experimental laminated die.

Referring now to FIG. 1, a portion of an experimental laminated extrusion die 10 is shown having a plurality of extrusion plates or die blades 12. Each die blade or extrusion plate is provided with a plurality of teeth or core pins 14 at an outlet or discharge end 16 of the die. The teeth or core pins are surrounded by discharge slots, including longitudinal discharge slots 18 lying within the plane of lamination between adjacent die blades, and transverse discharge slots 20 extending transversely across each die blade between the teeth or core pins 14 formed therein. Each extrusion plate or die blade has a plurality of longitudinally extending ribs or channel dividers 22, which space adjacent die blades apart, and form feed channels 24 extending from an inlet face of the die (not shown) to the discharge slots 18, 20 at the outlet face of the die. As previously mentioned, the present invention is directed toward the control of flow impedance of the batch material through the die, so as to provide complete knitting of the batch material within the discharge slots and uniform flow of the batch material through the die. The concept of impedance, as it applies to a laminated die, is the amount of resistance which the die structure presents to fluid flow through the die. Ideally, it would be desirable that all areas of a particular plane parallel to the outlet face of the die have the same impedance, so as to provide uniform flow therethrough, however, such is not usually the case in a laminated die since differences in impedance can be attributed to such variables as flow geometry, gap dimensions, surface finish within the flow channels, and coefficient of friction of such surfaces.

The geometry of the flow path through the die can effect the resistance which the die structure has to the fluid flow of the batch, since a fluid experiences substantially less resistance when traveling in a straight line as compared to that resistance required in making a 90° turn. In a like manner, the gap distance between two parallel die plates certainly affects the impedance to flow between such plates. This is especially true when positioning the plates so that the core pins provide discharge slots therebetween of 0.004", since there is a significant difference in flow impedance between a 0.004" slot and a 0.005" slot. Also, the relative smoothness of the surface finish of the feed channels and discharge slots have an effect on the impedance to flow, particularly since the surface finish also has an effect on the coefficient of friction of the particular material utilized. Thus, the concept of impedance of the die and more importantly, the difference in impedance of different areas of the die is very important in making a successful die which provides not only for a good knitting of the batch material within the die but also uniform flow therefrom.

As previously pointed out, the various teeth or core pins formed in the outlet face of the laminated die are separated by a plurality of discharge slots lying in various flow planes. A plane perpendicular to FIG. 1 and containing line A-B represents a plane of lamination between adjacent extrusion plates or die blades, whereas a plane parallel to FIG. 1 and perpendicular to a plane of lamination represents a transverse plane of the teeth. As the flow of batch material represented by arrows F proceeds through the feed channels 24, the flow F arrives at the intersection 26 between the feed channels 24 and the discharge slots 18, 20. At this point, it can be seen that flow impedance in the plane of lamination is less than the impedance in the transverse plane of the teeth, since the batch has a free flow path in the direction of the arrows F (i.e. in the plane of lamination), while the batch must alter directions 90°, as shown by arrows T in the transverse plane of the teeth, in order to have good knitting or cohesiveness of the batch material in such plane, and for providing a continuous cellular batch within the die before being discharged longitudinally therefrom.

Upon extruding batch material through experimental dies such as shown in FIG. 1, it was found that the resulting substrate exhibited excessive ripple in the plane of lamination and poor knitting in the transverse plane of the teeth. The rippling effect is attributed to a difference in the velocity of the batch passing through the plane of lamination vs. the transverse plane of the teeth, which velocity difference correlates with the difference in impedance to the batch flow in the various planes. That is, the impedance to batch flow in the plane of lamination is much lower than the impedance to batch flow in the transverse plane of the teeth, wherein a 90° change in flow direction from the feed channels 24 is required. Thus, in order to overcome such batch flow problems and provide for equalized impedance in both the plane of lamination and the transverse plane of the teeth, I devised the baffled laminated die shown in FIGS. 2-7.

Figure 2:
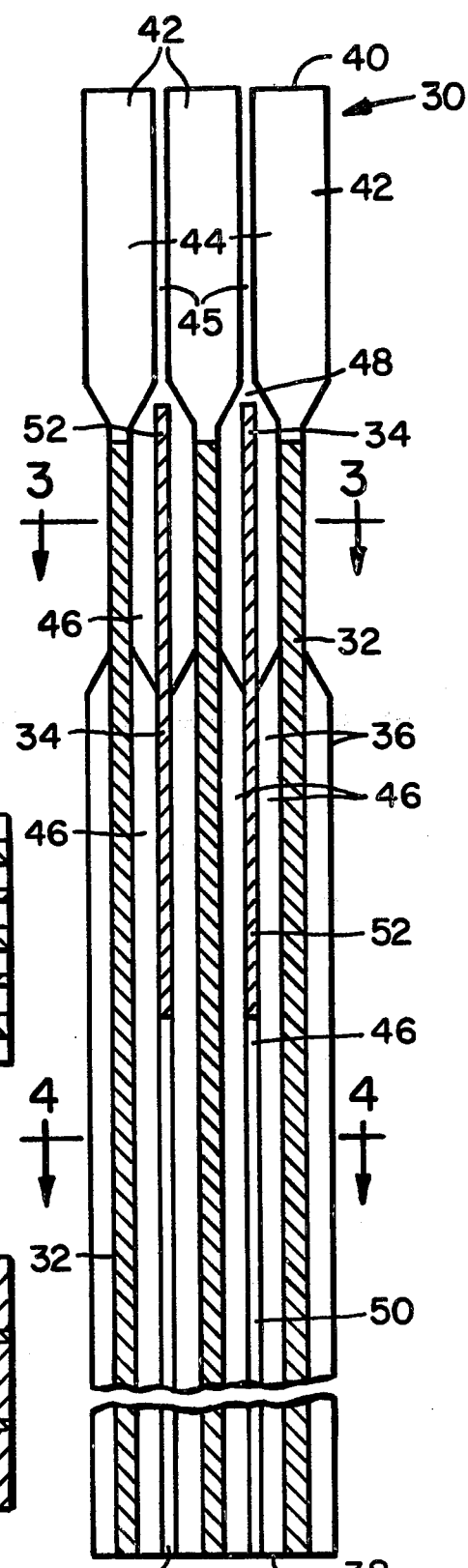
FIG. 2 is a greatly enlarged fragmented view in section of a portion of a laminated extrusion die embodying the present invention.
Figure 3:
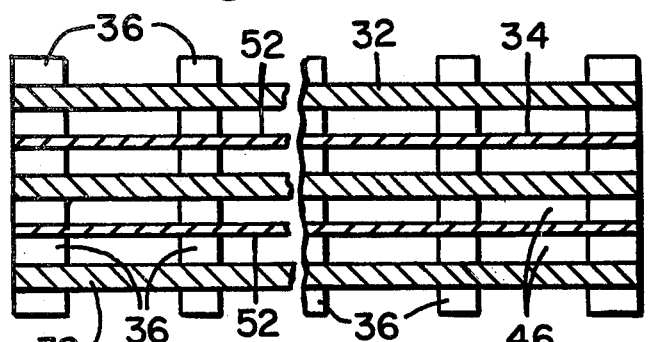
FIG. 3 is a fragmental cross-sectional view taken along line 3—3 of FIG. 2.
Figure 4:
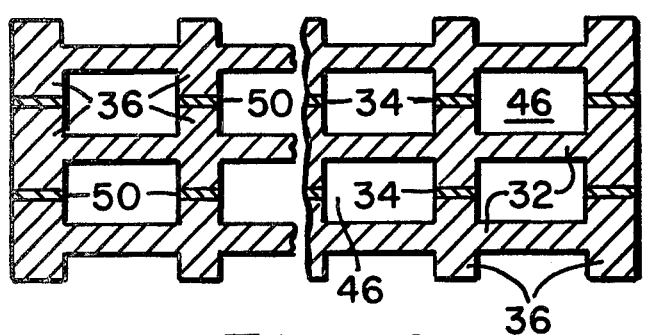
FIG. 4 is a fragmented cross-sectional view taken along line 4—4 of FIG. 2.
Figure 7:
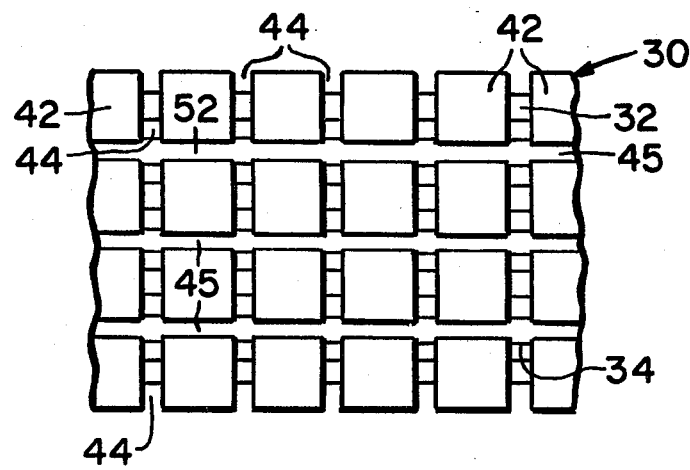
FIG. 7 is a fragmental plan or elevational view, depending upon the orientation of the laminated die, of the outlet face of the die shown in FIG. 2.

Referring particularly to FIGS. 2, 3, and 7, a laminated baffled extrusion die 30 for forming honeycomb structures is shown including a plurality of extrusion plates or die blades 32, spaced apart by a baffle member or impedance means 34 positioned between adjacent die blades. As shown also in FIG. 6, each extrusion plate or die blade 32 has a plurality of ribs or channel dividers 36, spaced apart across its length, and extending from an inlet face 38 of the die toward an outlet or discharge face 40. The outlet face 40 of each die blade has a plurality of teeth or core pins 42 formed along its length, and separated by transverse discharge slots 44 which extend inwardly of the outlet face 40 toward inlet face 38. The ribs or channel dividers 36 form a plurality of feed channels 46 which extend longitudinally through the die from inlet face 38, and communicate with root or inner end portions 48 of the discharge slots (see FIG. 2).

Figure 5:
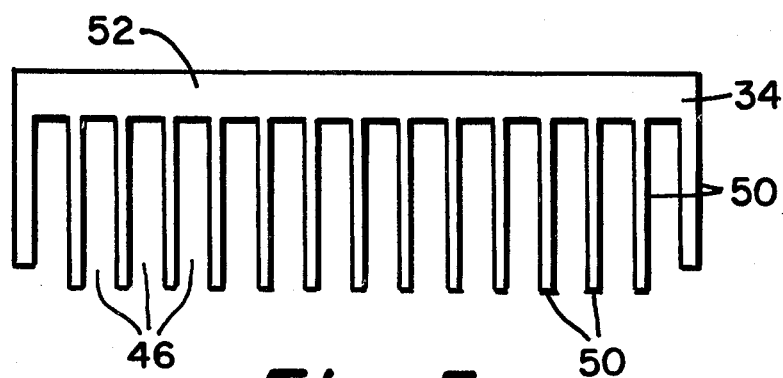
FIG. 5 is a plan or elevational view, depending upon the orientation of the extrusion die, of a baffle member embodying an impedance means of the present invention.
Figure 6:
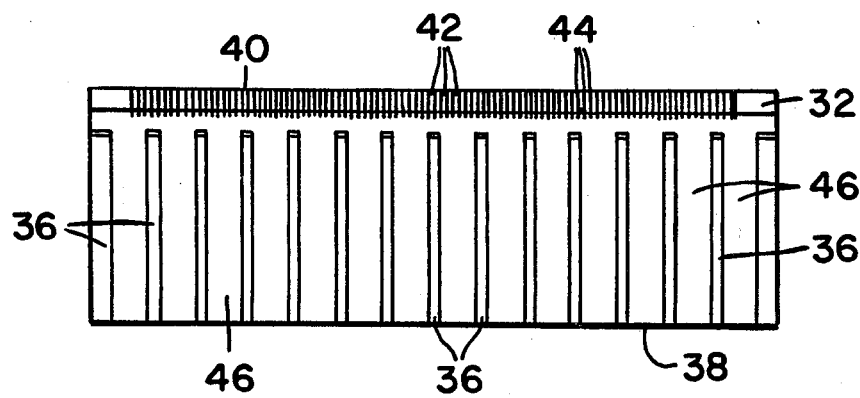
FIG. 6 is a plan or elevational view, depending upon the orientation of the laminated die, of a die blade or extrusion plate utilized to form the laminated die of the present invention.

As shown more particularly in FIG. 5, the baffle member 34 has a plurality of leg portions 50 which are positioned between ribs 36 of adjacent die blades 32, such that the portion between such leg portions becomes a part of the feed channels 46. In addition, the baffle members 34 have an impedance portion 52 which extends across the length of the die blades 32 between inner end portions 48 of the discharge slots and inner end portions of the ribs 36, so as to impede the flow of the batch material in its longitudinal movement through feed channels 46, as such flow approaches the root intersections 48 of the discharge slots 44, 45. The impedance portion 52, as shown in FIG. 2, lies centrally of the feed channels 46 adjacent the root or inner end portions 48 of the discharge slots 44, 45, and the length and thickness of the impedance portion 52 may be varied as desired so to adjust the impedance longitudinally through the die.

It will be apparent that the longitudinal discharge slots 45, formed between adjacent die blades 32, lie within a plane of lamination of the die, whereas transverse discharge slots 44 lie within a transverse plane of the teeth. Thus, as batch material flows longitudinally through the die from the inlet face 38 to outlet face 40, it must change direction 90° in order to flow within the transverse discharge slots 44 and provide good knitting of the cellular structure. Baffle member 34 is accordingly placed between two adjacent die blades 32, and the height and thickness of the impedance portion 52 is predetermined so as to provide a desired impedance in the laminated plane. That is, by optimizing the height and thickness of the impedance portion 52 of the baffle members 34, the impedance in both the plane of lamination and the transverse plane of the teeth may be equalized to facilitate the extrusion of a continuous cellular mass from the laminated die.

Although the difference in impedance in various planes parallel to the face of the die may be attributed to geometry of the die, gap dimensions, surface finish and coefficient of friction of the die surfaces adjacent bath flow, it has been proven that to have a successful laminated die, the impedance in the plane of lamination must be equal to the impedance in the transverse plane of the teeth. The baffle member or impedance means of the present invention functions to equalize such impedance.

As a specific example, but by no means limiting in nature, a laminated extrusion was formed containing 40 die blades which were about 4½" long side edge to side edge, 1⅜" between inlet and outlet faces, and about 0.04" thick including the ribs or channel dividers which were slightly less than about 0.01" on each side of the die blade. A baffle member having a length equal to the length of the die blade, a thickness of about 0.006" and an effective impedance length of 0.025" was brazed between adjacent die blades. A plurality of 83 transverse discharge slots having a width of 0.0035" were formed in the discharge face of each die blade a distance of about 0.2". The impedance portion of the baffle member terminated adjacent the inner end portion of the discharge slots and such terminal end was spaced apart from an entrance edge to such slots a distance of 0.006". Edge portions of the various plates were then sealed and the plates clamped together to form a laminated die having transverse and longitudinal discharge slots both equal to about 0.0035".

Although the now preferred embodiments of the invention have been disclosed, it will be apparent to those skilled in the art that various changes and modifications may be made thereto without departing from the spirit and scope thereof as defined in the appended claims.

We claim:

1. A laminated extrusion die for forming honeycomb structures which comprises:
   a plurality of die blades, having inlet ends and outlet ends, stacked together to form a laminated extrusion die;
   rib means formed on, and spaced apart across the length of, each of the die blades, and extending intermediate said inlet and outlet ends for forming longitudinally extending feed channels between adjacent die blades;
   each of said die blades having a plurality of core pins formed in its outlet end and separated by transverse discharge slots, extending inwardly from said outlet end, in communication at end portions thereof with said feed channels;
   said core pins formed in adjacent die blades being spaced apart by longitudinal discharge slots, each lying in a plane of lamination between adjacent die blades;
   said longitudinal discharge slots effectively forming a continuation of said feed channels, with each longitudinal discharge slot and its associated feed channels lying within a common plane of lamination;
   said transverse discharge slots lying within a plurality of planes transverse to said planes of lamination;
   and impedance means positioned within said feed channels adjacent inner end portions of, and extending across the length of, said longitudinal discharge slots, for impeding the longitudinal flow of batch material through said longitudinal discharge slots lying within the planes of lamination, and for equalizing flow impedance in the planes of lamination and the transverse planes so as to fill all of the interconnected discharge slots with batch material and form a cohesive honeycomb structure.

2. A laminated extrusion die for forming honeycomb structures as defined in claim 1 wherein said impedance means includes a baffle member positioned between adjacent die blades.

3. A laminated extrusion die for forming honeycomb structures as defined in claim 2 wherein said baffle member includes an impedance portion extending across all of the feed channels between an adjacent pair of die blades, said impedance portion extending a predetermined distance within said feed channels from adjacent said inner end portions of said longitudinal discharge slots to provide a desired impedance to flow through said longitudinal discharge slots.

4. A laminated extrusion die for forming honeycomb structures as defined in claim 2 wherein each said baffle member includes an impedance portion positioned within feed channels adjacent an associated longitudinal discharge slot, and said impedance portion being of a predetermined length and thickness so as to provide a desired impedance to batch flow through said associated longitudinal discharge slot.

5. A laminated extrusion die for forming honeycomb structures which comprises:
   a plurality of die blades positioned adjacent one another in a substantially parallel relationship;
   means securing said plurality of substantially parallel die blades together for forming a unitary extrusion die;
   said die having an inlet face and an outlet face;
   a plurality of feed channels between said parallel die blades extending longitudinally inwardly from said inlet face;
   a plurality of interconnected discharge slots formed in said outlet face and extending longitudinally inwardly therefrom;
   said interconnected discharge slots communicating at inner end portions thereof with said feed channels;
   and baffle means positioned within said feed channels adjacent the inner end portions of said interconnected discharge slots for impeding longitudinal flow of batch material through certain of said discharge slots and for equalizing flow impedance in said interconnected discharge slots so as to fill all of said interconnected discharge slots with batch material and discharge a cohesive honeycomb structure from said die.

6. A laminated extrusion die for forming honeycomb structures as defined in claim 5 wherein said plurality of interconnected discharge slots includes a plurality of transverse discharge slots formed transversely across each of said die blades within a central portion of its longitudinal extent, and a plurality of longitudinal discharge slots formed longitudinally along and between adjacent ones of said plurality of die blades; said longitudinal slots and said transverse slots being of substantially identical widths; and said longitudinal discharge slot, said feed channel and said baffle means between a pair of adjacent die blades all lying within a common plane of lamination extending between said pair of die blades.

7. A laminated extrusion die for forming honeycomb structures as defined in claim 6 wherein said baffle means is in the form of a baffle member positioned between adjacent die blades, and having an impedance portion positioned within said longitudinally extending feed channels formed between said adjacent blades, and said impedance portion having predetermined length and width for impeding the longitudinal flow of batch material from said feed channels through said longitudinal discharge slots and for facilitating the equalized flow of such batch material within said transverse discharge slots to provide good knitting of the batch material within the die.

8. A laminated extrusion die for forming honeycomb structures as defined in claim 5 including a plurality of channel dividers for forming said feed channels and for spacing adjacent blades a predetermined distance apart; a baffle member forming said baffle means, having an impedance portion positioned within said feed channels and extending across the length of said certain discharge slots, and having leg portions positioned between adjacent channel dividers formed on said die blades.

9. A laminated extrusion die for forming honeycomb structures which comprises:
  a plurality of die blades positioned adjacent one another and secured together so as to form a laminated extrusion die;
  means for maintaining portions of adjacent die blades in predetermined spaced apart relationship for forming flow passageways for batch material between adjacent die blades;
  interconnected discharge slots, including longitudinal slots and transverse slots, formed in said laminated extrusion die and communicating with said flow passageways;
  and impedance means, positioned centrally within said flow passageways adjacent said interconnected discharge slots and extending across the length of said longitudinal discharge slots, for impeding longitudinal flow of batch material through said longitudinal discharge slots, and for equalizing the impedance to flow through the various discharge slots to facilitate uniform flow of such batch material within both said longitudinal and transverse discharge slots.

10. A method for forming an extruded honeycomb structure from flowable batch material which comprises;
  flowing batch material into one end of an extrusion die having longitudinally extending feed channels communicating with intersecting discharge slots, which include longitudinal slots forming continuations of said feed channels, and transverse slots lying transversely of said feed channels;
  flowing said batch material longitudinally through said feed channels;
  providing baffle members within said feed channels along the extent of the length of the longitudinal slots;
  impeding the longitudinal flow of said batch material into said longitudinal discharge slots while simultaneously facilitating the flow of said batch material into said transverse discharge slots to equalize flow impedance in said slots;
  and discharging said batch material from said interconnected discharge slots as a cohesive honeycomb structure.

11. A method of forming a honeycomb structure from flowable batch material as defined in claim 10 including the step of varying the amount of impedance provided by the baffle member so as to provide substantially equal impedance to the batch flow through the transverse and longitudinal discharge slots.

12. A method of forming a honeycomb structure from extrudable batch material which comprises:
  initially flowing such batch material into and longitudinally along a plurality of feed channels within a die structure;
  flowing such batch material from said feed channels simultaneously into longitudinal discharge slots, formed as extensions of said feed channels, and transverse discharge slots, extending transversely of said feed channels;
  positioning baffle means within said feed channels adjacent said discharge slots and along the longitudinal extent of said longitudinal discharge slots;
  impeding the flow of batch material into said longitudinal discharge slots by means of said baffle member to equalize flow impedance in longitudinal and transverse discharge slots while simultaneously flowing batch material into said transverse discharge slots;
  and discharging a cohesive honeycomb structure from said die.

13. A method of forming a honeycomb structure from batch material as defined in claim 12 including the steps of varying the impedance to flow into the longitudinal discharge slots provided by the baffle member so that the impedances to flow within the transverse discharge slots and the longitudinal discharge slots are substantially equal.

* * * * *